US012247437B2

(12) United States Patent
Bishop

(10) Patent No.: US 12,247,437 B2
(45) Date of Patent: Mar. 11, 2025

(54) SILL PAN SYSTEM FOR DOORS AND METHODS OF MAKING AND USING THE SAME

(71) Applicant: Andrew H. Bishop, Carthage, NC (US)

(72) Inventor: Andrew H. Bishop, Carthage, NC (US)

( * ) Notice: Subject to any disclaimer, the term of this patent is extended or adjusted under 35 U.S.C. 154(b) by 182 days.

(21) Appl. No.: 18/087,876

(22) Filed: Dec. 23, 2022

(65) Prior Publication Data

US 2024/0209677 A1 Jun. 27, 2024

(51) Int. Cl.

*E06B 1/70* (2006.01)
*E06B 1/68* (2006.01)
*E06B 3/96* (2006.01)
*E06B 7/14* (2006.01)

(52) U.S. Cl.

CPC .................. *E06B 1/70* (2013.01); *E06B 1/68* (2013.01); *E06B 1/702* (2013.01); *E06B 1/705* (2013.01); *E06B 3/9632* (2013.01); *E06B 7/14* (2013.01)

(58) Field of Classification Search

CPC ... E06B 1/68; E06B 1/70; E06B 1/702; E06B 1/705; E06B 3/9632; E06B 7/14
See application file for complete search history.

(56) References Cited

U.S. PATENT DOCUMENTS 7,222,462 B2 * 5/2007 Ellingson .................. E06B 1/70 52/62
7,877,945 B2 * 2/2011 Eggen ..................... E06B 1/702 52/95
8,443,554 B1 * 5/2013 Teodorovich ........... E06B 1/705 52/204.5
9,909,353 B2 * 3/2018 Hendricks ............... E06B 1/702
9,982,477 B1 * 5/2018 Glickman ............. E06B 3/9632
10,024,097 B1 * 7/2018 Glickman ................. E06B 7/14
10,900,272 B2 * 1/2021 Glickman ................. E06B 1/62
2005/0144865 A1 * 7/2005 Ellingson .................. E06B 1/70 52/272
2005/0217189 A1 * 10/2005 Moffitt ...................... E06B 7/14 52/209
2009/0272045 A1 * 11/2009 Teodorovich ........... E06B 1/705 52/58
2012/0144761 A1 * 6/2012 Teodorovich ........... E06B 1/705 52/62
2015/0075245 A1 * 3/2015 Murphy .................... E06B 1/70 72/339
2017/0081902 A1 * 3/2017 Hendricks ................. E06B 1/70
2017/0204654 A1 * 7/2017 Heid ......................... E06B 7/14
2020/0002999 A1 * 1/2020 Glickman ................. E06B 1/68
2020/0109598 A1 * 4/2020 Roung ...................... E06B 1/62

FOREIGN PATENT DOCUMENTS

WO WO-2006081433 A1 * 8/2006 ............... E06B 1/62

* cited by examiner

*Primary Examiner* — Jessie T Fonseca

(74) *Attorney, Agent, or Firm* — Ashley D. Johnson; Dogwood Patent and Trademark Law

(57) ABSTRACT

The invention is a sill pan system that can be targeted for commercial and/or multi-family use and that works with ADA compliant thresholds. Specifically, the sill pan system includes a left end segment that is configured to fit in the bottom left corner of a framed-in door opening. The system also includes a right end segment that is configured to fit in the bottom right corner of a framed-in door opening. The left and right end segments are joined together at single seam. The top face of the sill pan is sloped to ensure that water and moisture is routed from the interior side of a building.

20 Claims, 8 Drawing Sheets

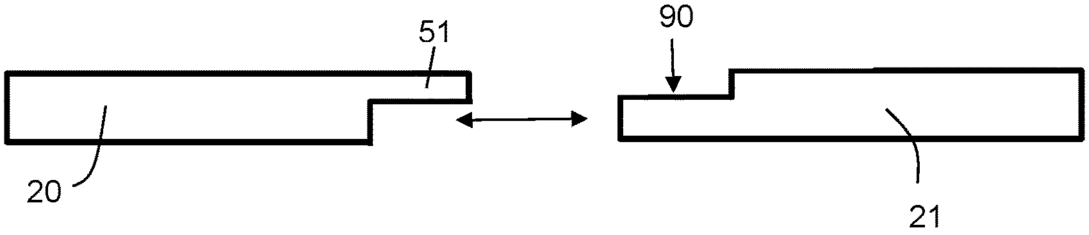
Fig. 2h
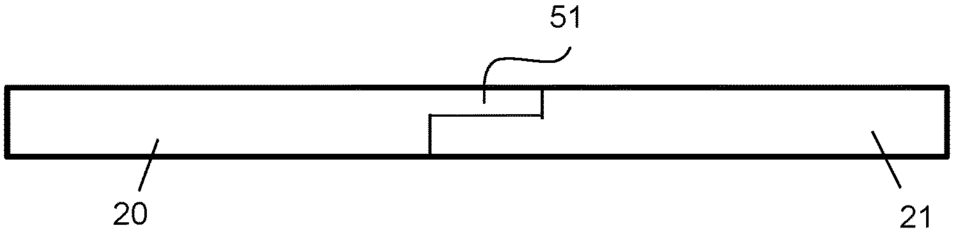
Fig. 2i
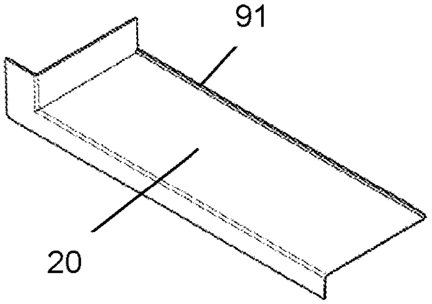
Fig. 2j
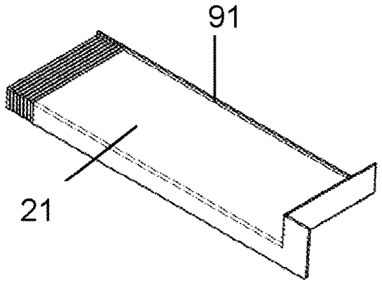
Fig. 2k
Fig. 2l
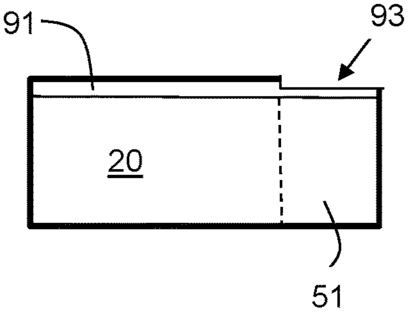
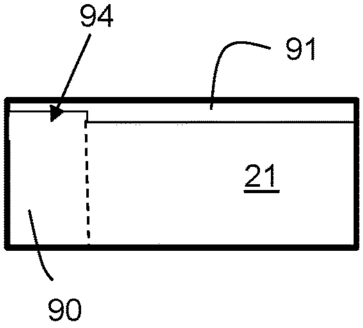
Fig. 2m

SILL PAN SYSTEM FOR DOORS AND METHODS OF MAKING AND USING THE SAME

TECHNICAL FIELD

The presently disclosed subject matter is generally directed to a sill pan system for use with doors. The presently disclosed subject matter also includes methods of making and using the disclosed sill pan system.

BACKGROUND

In modern construction, window and door systems generally are provided as integral pre-hung units that include door or window panels pre-mounted in a frame. The frame is typically formed by vertical jambs, a top header, and a bottom sill or threshold assembly that spans the bottom ends of the jambs. The pre-hung units are fitted and secured within appropriately sized framed-in openings in the walls of a building. Specifically, framed-in openings for pre-hung door units include vertical studs and a header, but the bottom sill plate of the door opening usually is formed by the sub-floor of the building. The pre-hung unit is positioned with its threshold resting on the bottom sill plate of the framed-in opening and the unit is leveled, plumed, and secured within the opening with nails or screws.

Over time, rainwater can leak beneath the sill or threshold of the door, causing the underlying framing studs and sub-floor components to rot. Since the rot generally is hidden from view, it often is not discovered until it is so severe that major renovation to replace rotted members is required. In response, water-proof sill pans have been developed. Prior art sill pans generally are made of plastic and include a central web that rests on and spans the framing plate, upwardly projecting end walls that extend partially up the vertical studs of a framed-in opening, an up-turned flange extending along the inside edge of the web, and flashing strips that wrap around onto the outside of the framed-in opening. While prior art sill pans have been somewhat successful, they are not compliant with the American Disabilities Act (ADA). Specifically, adjustable door thresholds for single family houses are much taller than ADA thresholds found on multi-family projects. Sill pans currently in use include an extended back dam/interior that sits above the threshold and causes an obstruction that could impede a resident from crossing with a wheelchair. It would therefore be desirable to provide an ADA-compliant sill pan system that overcomes the shortcomings of the prior art.

SUMMARY

In some embodiments, the presently disclosed subject matter is directed to a sill pan system for installation on a framed in door opening extending between bottom end portions of two vertical studs of the framed in door opening. Specifically, the system comprises a left end segment configured to be fitted at one end of the door opening adjacent to the bottom end portion of the first vertical stud. The system also includes a right end segment configured to be fitted at an opposite end of the door opening adjacent to the bottom end portion of the second vertical stud. The left end segment comprises a left top panel comprising a left edge, a right edge, a length, and a width; a left vertical wall extending upward from the left edge of the left top panel and extending the width of the left top panel; an L-shaped left flange extending downward from a front edge of the left top panel and upward to contact a side edge of the left vertical wall; and a lip positioned at the right edge of the left top panel. The right end segment comprises a right top panel comprising a left edge, a right edge, a length, and a width; a right vertical wall extending upward from the right edge of the right top panel and extending the width of the top panel; an L-shaped right flange extending downward from a front edge of the right top panel and upward to contact a side edge of the right vertical wall; and a plurality of spacing ribs positioned at the left edge of the right top panel. The lip is configured to overlay the spacing ribs, thereby joining the left end segment to the right end segment at a seam. The left vertical wall and the right vertical wall overlap at a rear edge of the left and right top panels. The left and right panels each include a back dam positioned at a rear edge, extending in an upward direction.

In some embodiments, the left end segment and right end segments each include a bottom face defined by a plurality of grooves.

In some embodiments, a bottom face of the lip lacks grooves.

In some embodiments, the disclosed sill pan system works with American Disabilities Act (ADA) compliant thresholds. In order to be ADA compliant, existing door thresholds are required to have a vertical height of no greater than 0.25 inches. However, a vertical height of up to 0.75 inches is allowed if a transition ramp is applied. If the door threshold is higher than 0.75 inches, an associated level-landing is required. A level-landing is the code-mandated solution for a threshold modification made to existing doorways with door threshold heights greater than 0.75 inches. Traditional solutions have included saw cutting, jackhammering, abrading, and pouring a built up cement landing. A more contemporary, and increasingly popular, solution is the use of modular landing and ramp systems, which are now a recognized product solution for ADA compliance per CSI MasterFormat Division 'Specialties' 10 74 49 (incorporated by reference herein). However, these solutions are costly and time-consuming to implement.

In some embodiments, the left top panel and right top panel are sloped downward about 1-10 degrees below horizontal. For example, the slope can be about 5.4 degrees in some embodiments.

In some embodiments, the left and right vertical end walls have a height of about 1-3 inches. For example, the left and right vertical end walls can have a height of about 2 inches.

In some embodiments, the left and right L-shaped flanges each have a first end with a height that differs from a second end height.

In some embodiments, the first end of the left and right L-shaped flanges has a height of about 2.5-4 inches (e.g., about 3.25 inches) and the second end of the left and right L-shaped flanges has a height of about 1 inch.

In some embodiments, the left top panel and right top panel each have a length of about 19.5 inches.

In some embodiments, the back dam has a height of about 3/16 of an inch (0.1875 inches). Thus, the back dam lip can include a height of about 0.1-0.5 inches (e.g., at least/no more than about 0.1, 0.2, 0.3, 0.4, or 0.5 inches).

In some embodiments, the grooves cover about 100 percent of the bottom face of the left and right end segments.

In some embodiments, the presently disclosed subject matter is directed to a sill pan kit. The kit includes a plurality of left end segments defined by a left top panel comprising a left edge, a right edge, a length, and a width; a left vertical wall extending upward from the left edge of the left top panel and extending the width of the left top panel; an L-shaped left flange extending downward from a front edge of the left top panel and upward to contact a side edge of the left vertical wall; a lip positioned at the right edge of the left top panel. The kit further includes a plurality of right end segments defined by: a right top panel comprising a left edge, a right edge, a length, and a width; a right vertical wall extending upward from the right edge of the right top panel and extending the width of the top panel; an L-shaped right flange extending downward from a front edge of the right top panel and upward to contact a side edge of the right vertical wall; a plurality of spacing ribs positioned at the left edge of the right top panel. The lip is configured to overlay the spacing ribs, thereby joining the left end segment to the right end segment at a seam. The left vertical wall and the right vertical wall overlap at a rear edge of the left and right top panels. A left end segment can be joined to a right end segment to create an assembled sill pan system.

In some embodiments, the presently disclosed subject matter is directed to a method of installing the disclosed sill pan system along a framed in doorway opening. Particularly, the method comprises fitting the left end segment at a lower left corner of the framed doorway opening. The method includes fitting the right end segment at a lower right corner of the framed doorway opening. The method includes adhering the lip to overlay the spacing ribs, thereby joining the left end segment to the right end segment at a seam. The L-shaped flanges extend below the doorway opening and to the left and right of the doorway opening, and the left and right vertical walls extend upward within the framed doorway opening.

BRIEF DESCRIPTION OF THE DRAWINGS

FIGS. 2*h* and 2*i* are side plan views of a left panel lip overlaying a right panel recessed region in accordance with some embodiments of the presently disclosed subject matter.

FIGS. 2*j* and 2*k* are perspective views illustrating the back dam of the left and right panels in accordance with some embodiments of the presently disclosed subject matter.

FIGS. 2*l* and 2*m* are top plan views of the back dam of the left and right panels in accordance with some embodiments of the presently disclosed subject matter.

DETAILED DESCRIPTION

Figure 1:
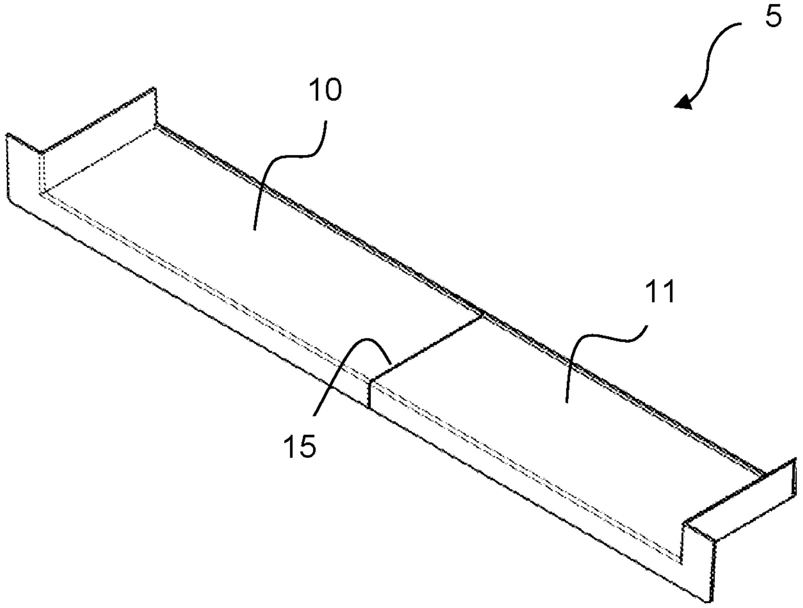
FIG. 1 is a perspective view of a sill pan system in accordance with some embodiments of the presently disclosed subject matter.

The presently disclosed subject matter is introduced with sufficient details to provide an understanding of one or more particular embodiments of broader inventive subject matters. The descriptions expound upon and exemplify features of those embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms “a”, “an”, and “the” refer to “one or more” when used in the subject specification, including the claims. Thus, for example, reference to “a device” can include a plurality of such devices, and so forth. It will be further understood that the terms “comprises,” “comprising,” “includes,” and/or “including” when used herein specify the presence of stated features, integers, steps, operations, elements, and/or components, but do not preclude the presence or addition of one or more other features, integers, steps, operations, elements, components, and/or groups thereof.

Unless otherwise indicated, all numbers expressing quantities of components, conditions, and so forth used in the specification and claims are to be understood as being modified in all instances by the term “about”. Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods.

As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the drawing figures. It will be understood that these terms and those discussed above are intended to encompass different orientations of the device in addition to the orientation depicted in the drawing figures.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The presently disclosed subject matter is directed to a door sill pan system that is configured to be used with American Disabilities Act (ADA) compliant door thresholds. The term "sill" as used herein refers to the horizontal bottom part of a window or door as defined by ASTM E 2112-07 Standard Practice for Installation of Exterior Windows, Doors, and Skylights, section 3.2.121, the entire content of which is incorporated by reference herein. The term "sill pan" refers to a flashing used at the base of a rough opening to divert incidental water to the exterior or to the exterior surface of a concealed WRB (weather-resistive barrier), as defined by ASTM E 2112-07 section 3.2.91, the entire content of which is incorporated herein. Conventional sill pans typically include a large portion of rigid plastic material that is positioned beneath an exterior door to prevent moisture from intruding into a building (e.g., commercial building, residential building). The sill pan further prevents the bottom of the door from rotting due to moisture exposure over time.

FIG. 1 illustrates one embodiment of the disclosed sill pan system 5 that can be targeted for commercial and/or multi-family use with ADA compliant thresholds. As shown, the sill pan system includes left end segment 10 that is configured to fit in the bottom left corner of a framed-in door opening. The system also includes right end segment 11 that is configured to fit in the bottom right corner of a framed-in door opening. The left and right end segments are joined together at single seam 15. The top face of the sill pan is sloped to ensure that water and moisture is routed from the interior side of a building, as discussed in detail below.

Figure 2A:
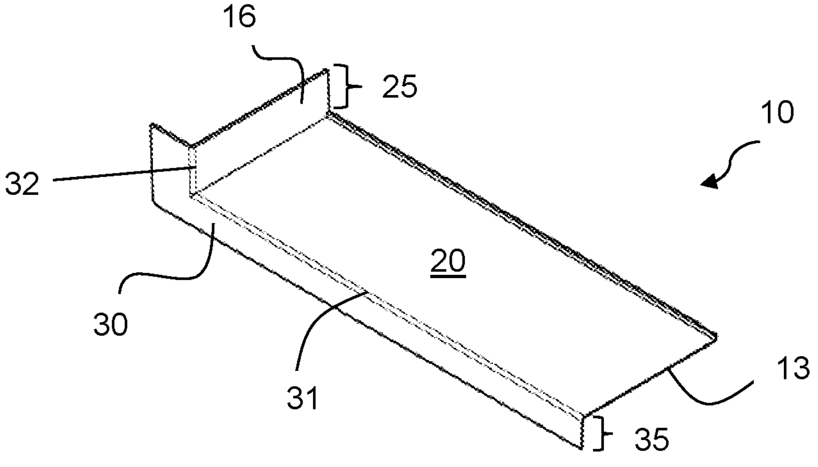
FIG. 2*a* is a perspective view of a left-end segment of a sill pan system in accordance with some embodiments of the presently disclosed subject matter.
Figure 2B:
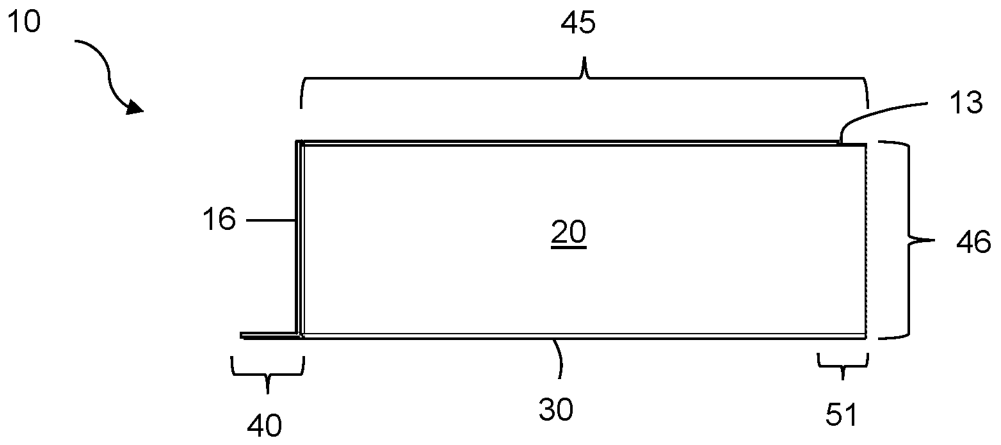
FIG. 2*b* is a top plan view of the left-end segment of FIG. 2*a* in accordance with some embodiments of the presently disclosed subject matter.
Figure 2C:
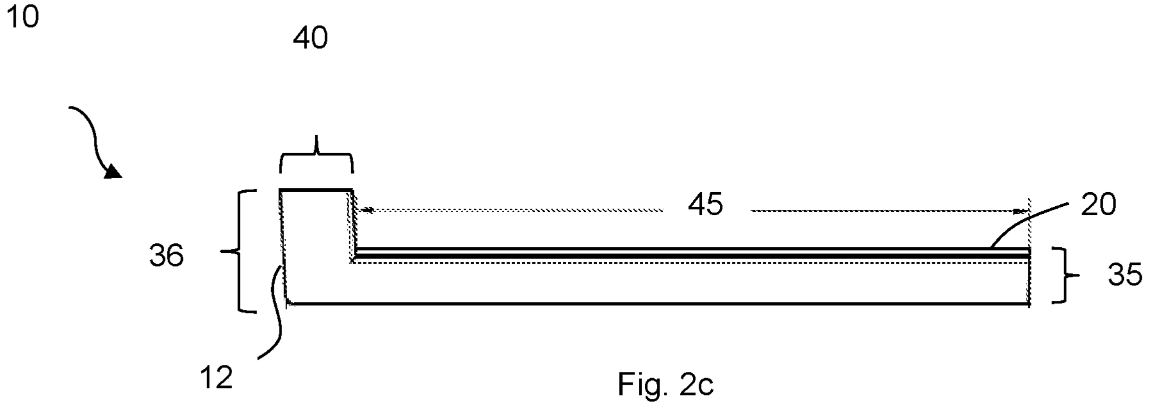
FIG. 2*c* is a front plan view of the left-end segment of FIG. 2*a* in accordance with some embodiments of the presently disclosed subject matter.

FIGS. 2*a*-2*c* illustrate one embodiment of left end segment 10 of the disclosed sill pan system. As shown, the left end segment includes left top panel 20 that overlies and covers at least a portion of an associated sill plate. Segment 10 further includes left vertical end wall 16 that extends partially up the left inside face of the doorway vertical stud. The left vertical end wall is configured to lie flush with the left side edge of a doorway. In some embodiments, left vertical end wall 16 can have height 25 of about 1.5 inches (e.g., at least/no more than about 1, 1.1, 1.2, 1.3, 1.4, 1.5, 1.6, 1.7, 1.8, 1.9, or 2 inches).

L-shaped flange 30 projects downwardly from the top panel at horizontal edge 31 to overlap the outside left surface of the sill plate. The flange also extends to the left of the vertical stud at edge 32. It will thus be appreciated that the left end segment covers and protects the left end of the sill plate and the bottom left corner portion of the framed-in opening. The vertical portion of flange 30 that extends to the left of the vertical stud has length 40 of about 2 inches (e.g., at least/no more than about 1.6, 1.7, 1.8, 1.9, 2, 2.1, 2.2, 2.3, 2.4, or 2.5 inches). The flange includes first height 36 at left end 12 of about 3.25 inches (e.g., at least/no more than about 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, or 4.6 inches). The flange includes second height 35 at right end 13 of about 1.5 inches (e.g., at least/no more than about 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, or 3.3 inches).

Figure 2D:
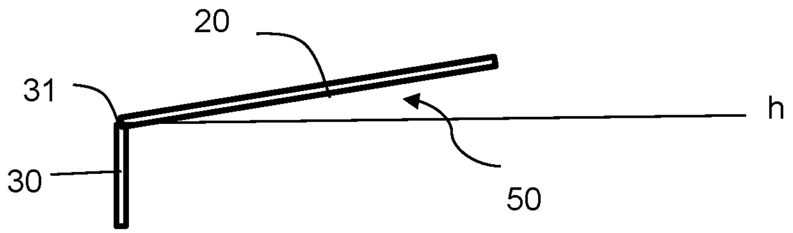
FIG. 2*d* is a side plan view of a left-end segment of a sill pan system in accordance with some embodiments of the presently disclosed subject matter.

Left top panel 20 can include length 45 of about 19.5 inches (e.g., at least/no more than about 15, 15.5, 16, 16.5, 17, 17.5, 18, 18.5, 19, 19.5, 20, 20.5, 21, 21.5, 22, 22.5, 23, 23.5, 24, 24.5, or 25 inches), as shown in FIGS. 2*b* and 2*c*. The top panel can include width 46 of about 6.5 inches (e.g., at least/no more than about 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, or 8 inches). For example, the top panel can have a width of about 6$\frac{9}{16}$ inches (6.5625 inches). The top panel is sloped in a downward direction from edge 31 to direct the flow of water and moisture away from the interior of a building, as illustrated in FIG. 2*d*. In some embodiments, the top panel can be configured at angle 50 of about 1-10 degrees above horizontal (h). Thus, angle 50 can be at least/no more than about 1, 2, 3, 4, 5, 6, 7, 8, 9, or 10 degrees above horizontal to help water move away from the interior side of a dwelling. The top panel further includes lip 51 positioned on right end 13. The lip overlays the right end segment, as explained below. Lip 51 can have width 52 of about 1 inch (e.g., at least/no more than about 0.5, 0.6, 0.7, 0.8, 0.9, 1, 1.1, 1.2, 1.3, 1.4, 1.5 inches).

Figure 2E:
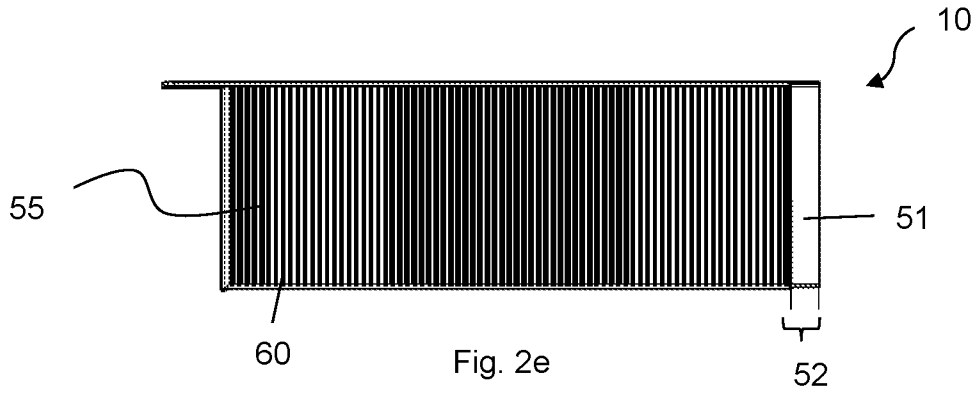
FIG. 2*e* is a bottom plan view of a left-end segment of a sill pan in accordance with some embodiments of the presently disclosed subject matter.
Figure 2F:
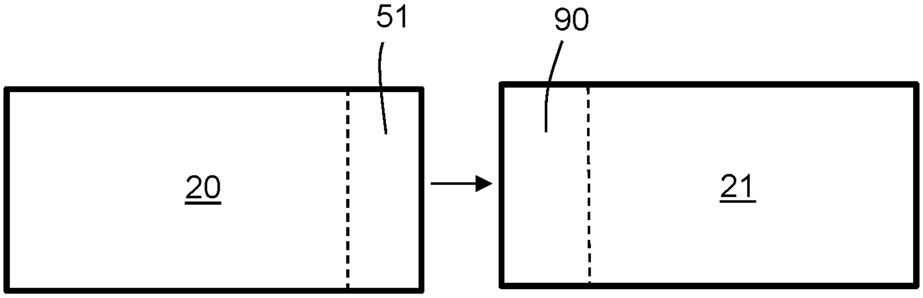
FIGS. 2*f* and 2*g* are top plan views of a left panel lip overlaying a right panel recessed region in accordance with some embodiments of the presently disclosed subject matter.
Figure 2G:
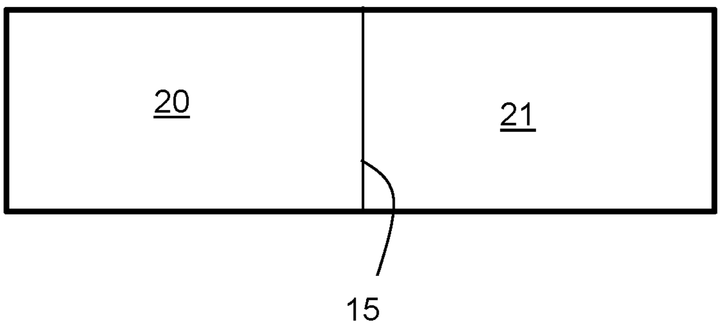

FIG. 2*e* illustrates bottom face 55 of the left end segment. As shown, the bottom face includes a plurality of grooves 60 extending along the width direction that function to provide a level surface to place the sloped sill pan onto associated framing. The term "groove" refers to a long and narrow cut, rut, indentation, channel, furrow, gutter, slot, or depression. Grooves 60 also allow sealant to adhere to the sill pan and the framing surface. Each groove can have a length that runs parallel to the width of the top face, as shown in FIG. 2*e*. Thus, grooves 60 can have a width of about 6.5 inches (e.g., at least/no more than about 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, or 8 inches). For example, the groove width can be about 6$\frac{9}{16}$ inches (about 6.5625 inches). Each groove can have a thickness of about 0.25 inches (e.g., at least/no more than about 0.1, 0.15, 0.2, 0.25, 0.3, or 0.35 inches). The left end segment can include about 10-100 grooves in some embodiments. It should be appreciated that the bottom face of lip 51 lacks grooves to allow the lip to overlay the right end segment.

FIGS. 2*f*-2*i* illustrate one embodiment of top panel lip 51 overlapping the bottom panel. In some embodiments, the bottom panel includes recessed area 90 that is sized and shaped to house lip 51. As shown, lip 51 overlaps with recessed area 90, allowing the left and right segments to connect together.

The left and right panels also include back dam 91, as shown in FIGS. 2*j* and 2*k*. The back dam extends in an upward direction. The back dam can have a height of about 3/16 inches (e.g., at least/no more than about 0.1, 0.2, 0.3 inches). As shown, the thickness of the back dam can be reduced at area 93 corresponding to lip 51 on left panel 20 and in area 94 on the right panel corresponding with the recessed area to allow the panels to overlap, as shown in FIGS. 2*l* and 2*m*.

About 100 percent of the bottom face of left end segment 10 includes grooves 60. The spaces between the grooves can present regions configured to allow adjustment of the length of the sill pan left and/or right end segments.

Figure 3A:
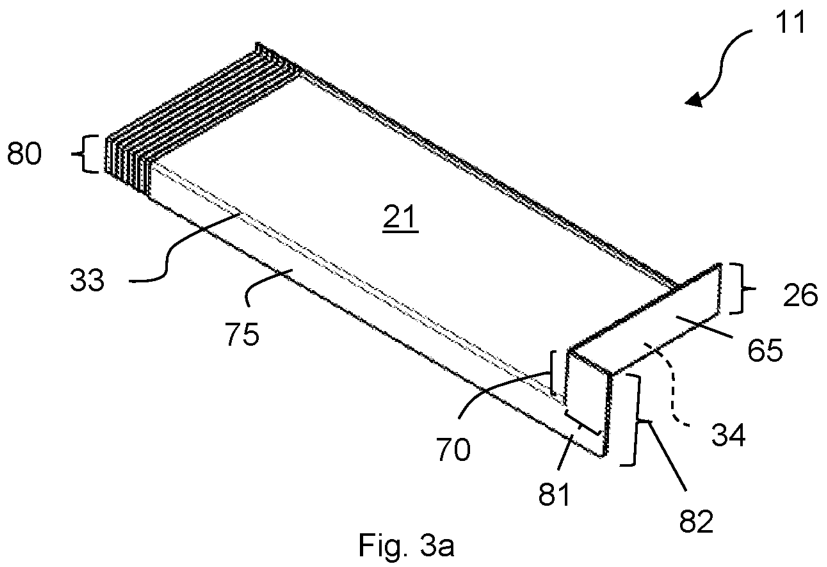
FIG. 3*a* is a perspective view of a right-end segment of a sill pan system in accordance with some embodiments of the presently disclosed subject matter.
Figure 3B:
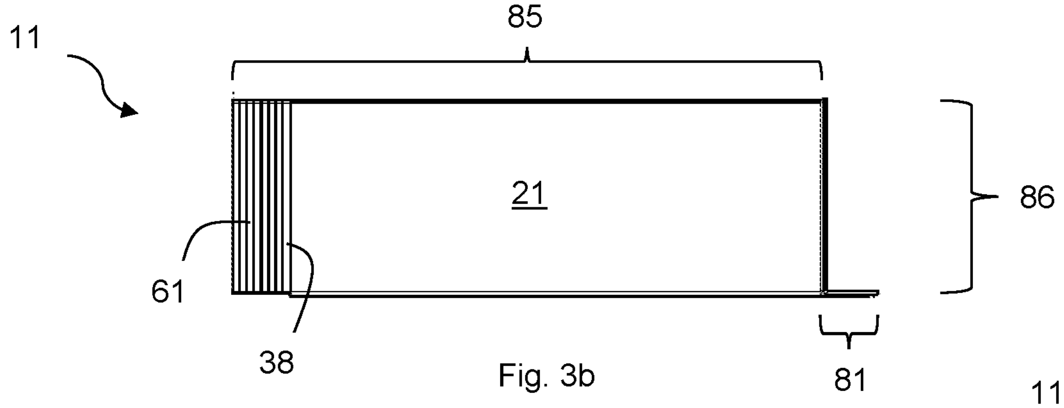
FIG. 3*b* is a top plan view of the right-end segment of FIG. 3*a* in accordance with some embodiments of the presently disclosed subject matter.
Figure 3C:
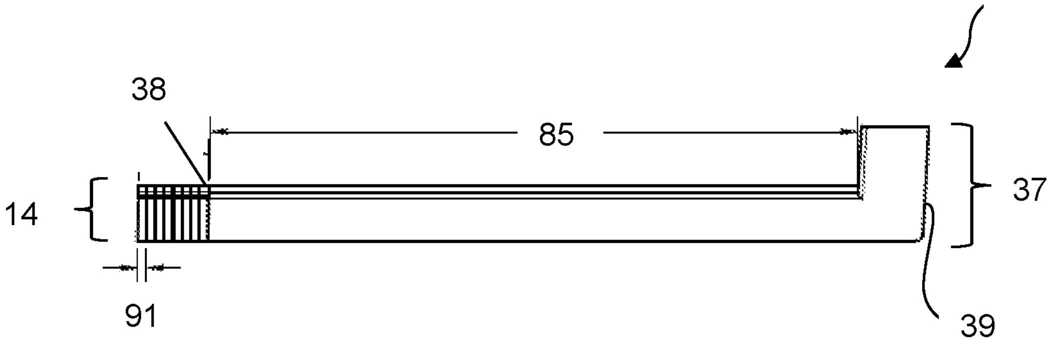
FIG. 3*c* is a front plan view of the right-end segment of FIG. 3*a* in accordance with some embodiments of the presently disclosed subject matter.

As set forth above right end segment 11 cooperates with the left end segment to form the disclosed sill pan system. FIGS. 3*a*-3*c* illustrate one embodiment of right end segment 11 comprising right top panel 21 that overlies and covers at least a portion of the right side of an associated sill plate. Right end segment 10 further includes right vertical end wall 65 that extends partially up the right inside face of the doorway vertical stud. The right vertical end wall is configured to lie flush with the right side edge of a doorway. In some embodiments, right vertical end wall 65 can have height 26 of about 2 inches (e.g., at least/no more than about 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, or 3 inches).

As shown, L-shaped right flange 75 projects downwardly from the top panel at horizontal edge 33 to overlap the outside right surface of the sill plate. The flange also extends to the right of the right-hand vertical stud. It will thus be appreciated that the right end segment covers and protects the right end of the sill plate and the bottom right corner portion of the framed-in opening. The vertical portion of flange 75 that extends to the right of the vertical stud has length 81 of about 2 inches (e.g., at least/no more than about 1.6, 1.7, 1.8, 1.9, 2, 2.1, 2.2, 2.3, 2.4, or 2.5 inches). The flange includes first height 37 at right end 39 of about 3.25 inches (e.g., at least/no more than about 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, or 5 inches). The flange includes second height 14 at left end 38 of about 1.25 inches (e.g., at least/no more than about 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, or 3 inches).

Figure 3D:
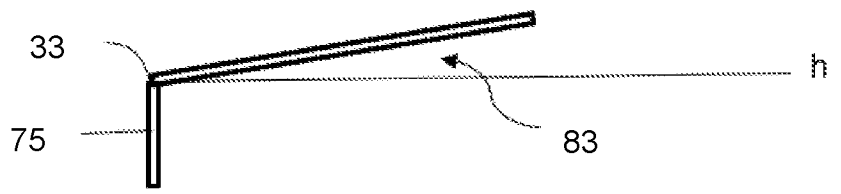
FIG. 3*d* is a side plan view of a right-end segment of a sill pan system in accordance with some embodiments of the presently disclosed subject matter.

Right top panel 21 can include length 85 of about 19.5 inches (e.g., at least/no more than about 15, 15.5, 16, 16.5, 17, 17.5, 18, 18.5, 19, 19.5, 20, 20.5, 21, 21.5, 22, 22.5, 23, 23.5, 24, 24.5, or 25 inches), as shown in FIGS. 3*b* and 3*c*. The top panel can include width 86 of about 6.5 inches (e.g., at least/no more than about 3, 3.5, 4, 4.5, 5, 5.5, 6, 6.5, 7, 7.5, 8, 8.5, 9, 9.5, or 10 inches). For example, the top panel can have a width of about 6 9/16 inches (6.5625 inches). The top panel is sloped in a downward direction from edge 33 to direct the flow of water and moisture away from the interior of a building, as illustrated in FIG. 3*d*. In some embodiments, the top panel can be configured at angle 83 of about 1-10 degrees above horizontal (h). Thus, angle 83 can be at least/no more than about 1, 2, 3, 4, 5, 6, 7, 8, 9, or 10 degrees above horizontal to help water move away from the interior side of a dwelling. The top panel further includes a series of spacing ribs 61 positioned adjacent to left end 38. Lip 51 is sized and shaped to overlay spacing ribs 61 positioned at the left end of the right end segment, as explained below.

Figure 3E:
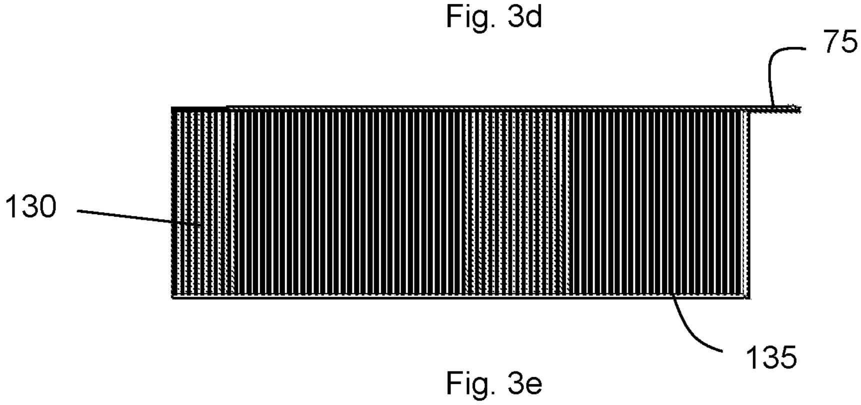
FIG. 3*e* is a bottom plan view of a right-end segment of a sill pan in accordance with some embodiments of the presently disclosed subject matter.

FIG. 3*e* illustrates bottom face 130 of the right end segment. As shown, at least a portion of the bottom face includes a plurality of grooves 135 extending along the width direction that function to provide a level surface to place the sloped sill pan onto associated framing. Grooves 135 also allow sealant to adhere to the sill pan and the framing surface. Each groove can have a length that runs parallel to the width of the top face, as shown in FIG. 3*e*. Thus, grooves 135 can have a width of about 6.5 inches (e.g., at least/no more than about 3, 3.5, 4, 4.5, 5, 5.5, 6, 6.5, 7, 7.5, 8, 8.5, 9, 9.5, or 10 inches). For example, each groove can include width of about 6 9/16 inches (6.5625 inches). Each groove can have a thickness of about 0.25 inches (e.g., at least/no more than about 0.1, 0.15, 0.2, 0.25, 0.3, or 0.35 inches). The right end segment can include about 10-100 grooves in some embodiments.

In some embodiments, about 100 percent of the bottom face of right end segment 11 includes grooves 135. The spaces between the grooves can present regions configured to allow adjustment of the length of the sill pan left and/or right end segments.

Figure 4A:
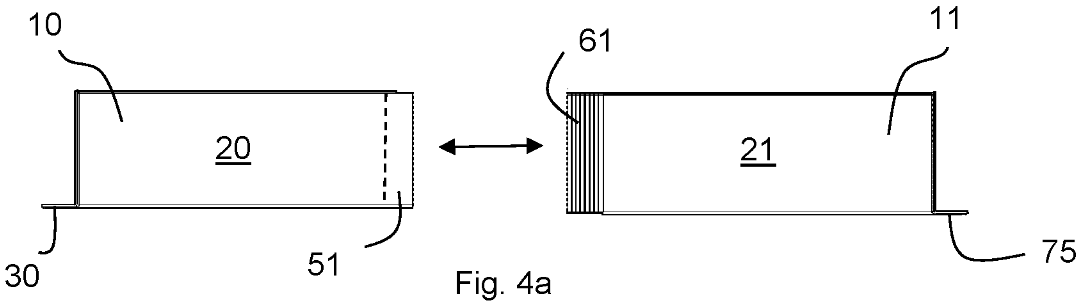
FIGS. 4*a* and 4*b* illustrate one embodiment of assembling the left and right-end segments of a sill pan in accordance with some embodiments of the presently disclosed subject matter.
Figure 4B:
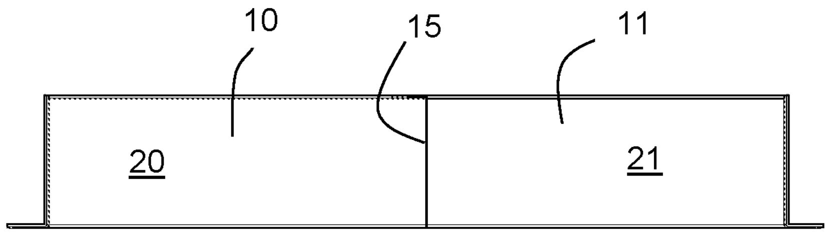
Figure 4C:
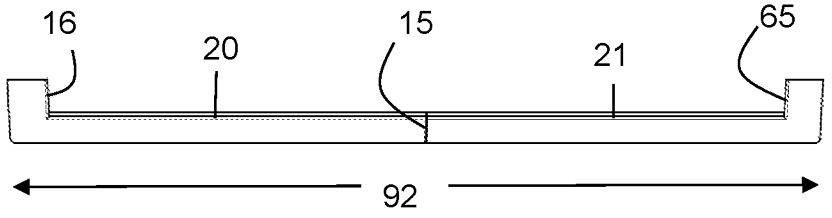
FIG. 4*c* is a front plan view of an assembled sill pan in accordance with some embodiments of the presently disclosed subject matter.

To assemble the disclosed sill pan system, left and right end segments 10, 11 are joined together at seam 15. Particularly, the segments are positioned such that lip 51 of the left end segment is overlayed on top of spacing ribs 61 of the right end segment, as shown in FIGS. 4*a*-4*c*. In this way, the top left and right hand panels are adjacent to each other, and spacing ribs 61 are positioned below lip 51. Any suitable method can be used to adhere the lip above the spacing ribs (such as the use of adhesive) to create a unitary structure consisting or comprising two segments. The assembled system can include 0.25 inch spacing lines where the two segments meet together to help installers visualize the proper placement. The length 92 of the assembled sill pan system can be about 38 inches (e.g., at least/no more than about 35, 36, 37, 38, 39, 40, 41, 42, 43, 44, or 45 inches). The disclosed system seals against the migration of water between the overlapping portions of the segments. In addition, the sloped top panels 20, 21 facilitate movement of water away from the interior of the structure.

The left and right end segments can be constructed from any suitable material, such as (but not limited to) plastic (polyurethane, nylon, polycarbonate, acetal, polypropylene, ultra-high molecular weight polyethyelene, PTFE) and/or metal (e.g., stainless steel, copper, lead, aluminum, or combinations thereof). It should be appreciated that the materials used are not limited and any suitable material(s) can be used.

Figure 5A:
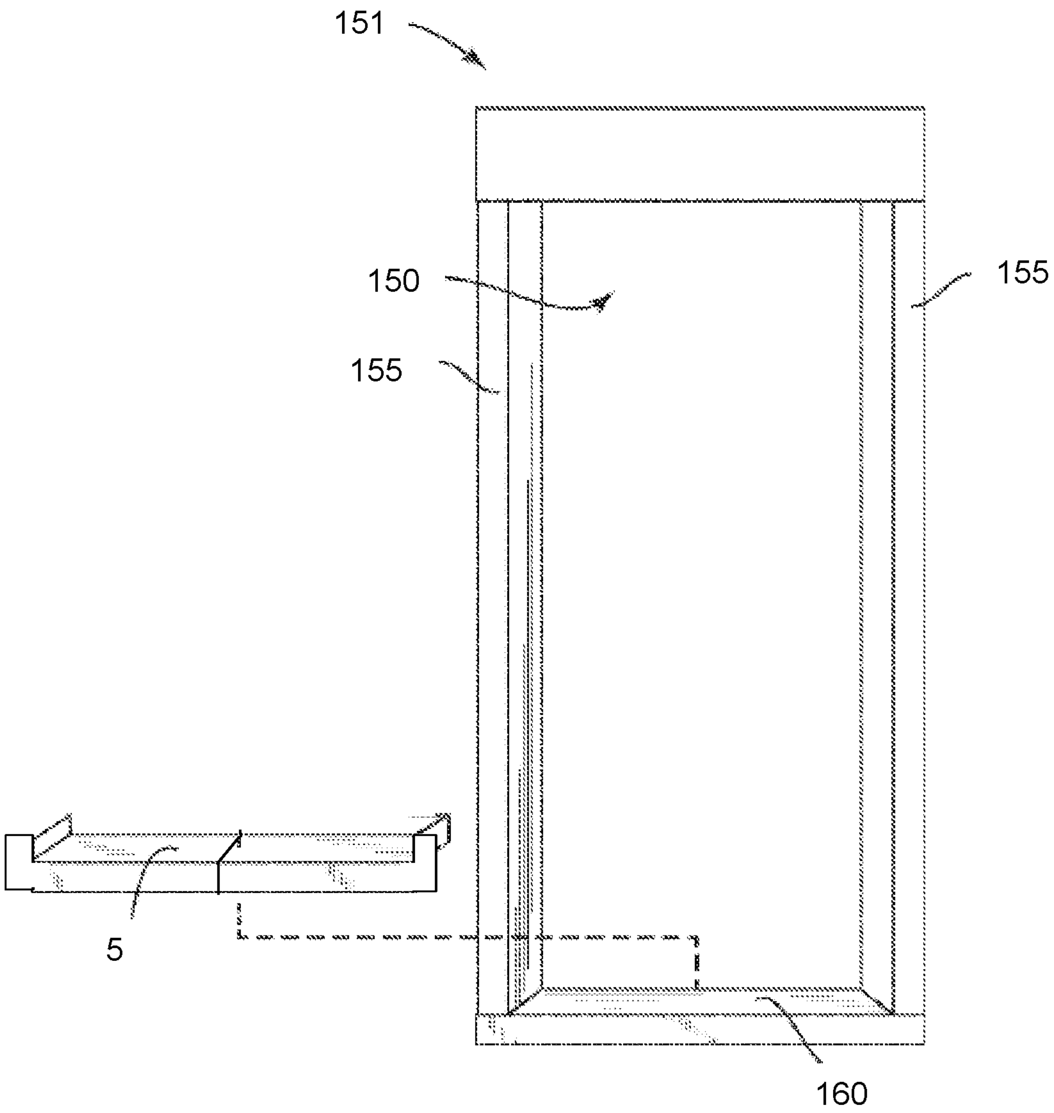
FIGS. 5*a* and 5*b* are front plan views of a sill pan system installed in a door opening in accordance with some embodiments of the presently disclosed subject matter.
Figure 5B:
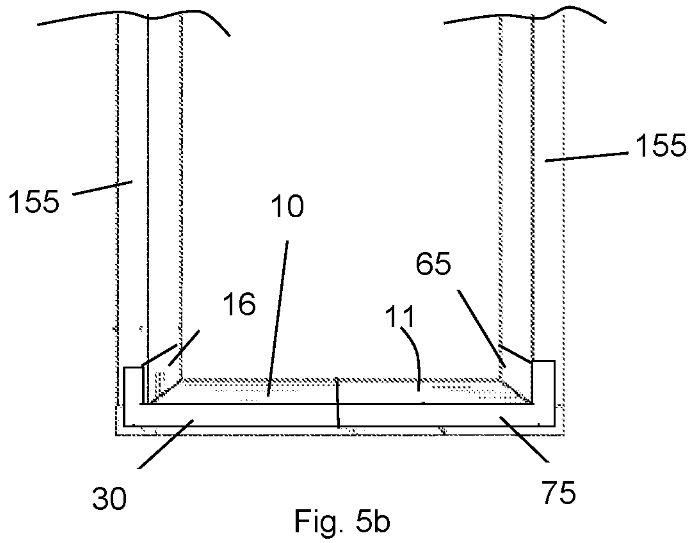

FIGS. 5*a* and 5*b* illustrate sill pan system 5 shown installed in a framed-in opening 150 of door opening 151 in a building structure between the bottom end portions of vertical studs 155 spanning and covering subflooring 160 and can be partially supported by a floor joist. The assembled system can be installed adjacent to the floor in the doorway such that the sloped top panels 20, 21 slope towards an exterior of the building, allowing rain, water, etc. to route away from the inside of the building. The L-shaped flange on each segment lies flush against the front face of vertical studs 155 and the left and right vertical end walls extend up to the interior face of the studs.

The dimensions of 150 can vary to correspond with the width of a single door panel but may also span a length for a French door entryway or an entryway configured to include one or more sidelight panels. Regional building codes, building materials, residential versus commercial construction, and other factors may also result in a variety of possible entryway widths (also called depths) corresponding to varying thicknesses of exterior building walls. The disclosed sill pan system can be sized up or down accordingly.

Figure 6:
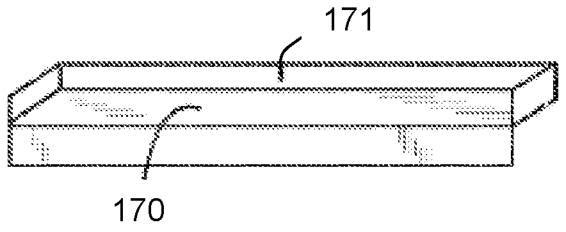
FIG. 6 is a perspective view of a prior art sill pan in accordance with some embodiments of the presently disclosed subject matter.

Once placed in the rough opening 150, adhesive and/or cement can be used to securing system 5 to the sub-floor. As noted in the Figures, the disclosed sill pan system lacks a raised ridge on the top surface as is commonly seen with prior art sill pans. One embodiment of a prior art sill pan 170 comprising rear ridge 171 is illustrated in FIG. 6. Advantageously, the disclosed sill pan system can cooperate with ADA compliant door thresholds. ADA thresholds are much shorter than conventional thresholds. Sill pans currently in use will not work with ADA thresholds as the rear ridge is too tall and does not meet ADA compliance. When applied to an ADA compliant threshold, prior art designs sit above the threshold and cause an obstruction that could impede a resident from crossing with a wheelchair. System 5 eliminates this issue as the back dam/interior lip sits lower than the height of the ADA compliant threshold.

The phrase "ADA-compliant" refers to a threshold system that accommodates individuals with disabilities. For example, a sill pan system that works with ADA compliant thresholds lack a wall that connects the rear edges of the sloped top panels 20, 21. In some embodiments, a sill pan system that works with ADA compliant thresholds can include a front flange with a width of about 3/16 inch (compared to conventional sill pans with a front flange width of 1.5 inches). The overall length of a sill pan system that works with ADA compliant thresholds can be about 39.5 inches, compared to prior art systems with a length of about 42.5 inches. The vertically extending walls of an ADA-compliant system can be about 2 inches, compared to conventional systems with a wall length of about 1.5 inches.

After the components of sill pan system 5 are assembled and installed as described and shown herein, a door frame or the like may be inserted into the rough opening 150 with the sill area being sealed against air and water intrusion through the wall.

The disclosed system offers many advantages over prior art sill pan systems. For example, the left and right segments can be each constructed as a single piece. Thus, the system includes a two-piece construction.

In some embodiments, the sill pan is adjustable up to about 2 inches (e.g., at least/no more than about 1, 1.5, 2, 2.5, or 3 inches). By configuring the system to be adjustable in at least one of the width and length dimensions, the total number of necessary product size combinations is expected to decrease relative to the use of fixed dimension sill pans.

Seam 15 beneficially allows installers to properly position the first and second segments and/or the fully assembled sill pan in the center of a doorway opening.

Advantageously, sill pan 5 can work with ADA compliant door thresholds found in a variety of commercial or multi-family applications.

In some embodiments, the disclosed sill pan can be configured as a kit. Specifically, the kit can include a left end segment and a right end segment, sized and shaped to be installed in a particular door opening. Alternatively, the kit can include a plurality of left and right end segments of the same or varying sizes, allowing a user to customize the sill pan system for a particular sized opening.

The present system, in addition to protecting structural components of a building, achieve disposal of moisture on sill pan surfaces that could otherwise be harmful to wood or manufactured building components.

Exemplary embodiments of the methods and components of the presently disclosed subject matter have been described herein. As noted elsewhere, these embodiments have been described for illustrative purposes only, and are not limiting. Other embodiments are possible and are covered by the presently disclosed subject matter. Such embodiments will be apparent to persons skilled in the relevant art(s) based on the teachings contained herein. Thus, the breadth and scope of the present invention should not be limited by any of the above-described exemplary embodiments but should be defined only in accordance with the following claims and their equivalents.

What is claimed is:

1. A sill pan system for installation on a framed in door opening extending between bottom end portions of two vertical studs of the framed in door opening, the system comprising:

a left end segment configured to be fitted at one end of the framed in door opening adjacent to the bottom end portion of a first vertical stud of the two vertical studs;

a right end segment configured to be fitted at an opposite end of the framed in door opening adjacent to the bottom end portion of a second vertical stud of the two vertical studs;

wherein the left end segment comprises:

a left top panel comprising a left edge, a right edge, a length, and a width;

a left vertical wall extending upward from the left edge of the left top panel and extending the width of the left top panel;

an L-shaped left flange extending downward from a front edge of the left top panel and upward to contact a side edge of the left vertical wall;

a lip positioned at the right edge of the left top panel, the lip defined as an extension adjacent to a top face of the left top panel with a thickness that is less than the thickness of the left top panel, wherein the decreased thickness is adjacent to the bottom face of the left top panel;

wherein the right end segment comprises:

a right top panel comprising a left edge, a right edge, a length, and a width;

a right vertical wall extending upward from the right edge of the right top panel and extending the width of the right top panel;

an L-shaped right flange extending downward from a front edge of the right top panel and upward to contact a side edge of the right vertical wall;

a recessed region positioned at the left edge of the right top panel, the recessed region defined as an extension adjacent to a bottom face of the right top panel with a thickness that is less than the thickness of the right top panel, wherein the decreased thickness is adjacent to the top face of the right top panel;

a plurality of spacing ribs positioned on a top face of the right end recessed region of the right top panel;

a back dam positioned upward from the top face of the right top panel and the top face of the left top panel, the back dam comprising a height of at least 0.1 inch and no more than 0.1875 inches, wherein the back dam comprises a first segment comprising an area of reduced thickness adjacent to the lip of the left top panel, and wherein the back dam comprises a second segment of reduced thickness adjacent to the recessed region of the right top panel, wherein the back dam first and second segments of reduced thickness overlap;

wherein the lip is configured to overlay the spacing ribs, thereby joining the left end segment to the right end segment at a seam;

wherein the lip and the right recessed region overlap at a rear edge of the left and right top panels; and wherein the thickness of the lip and the thickness of the recessed region when overlapped is the same thickness of the left top panel and the same thickness as the right top panel.

2. The sill pan system of claim 1, wherein the left end segment and the right end segment each include a bottom face defined by a plurality of grooves.

3. The sill pan system of claim 2, wherein a bottom face of the lip lacks grooves.

4. The sill pan system of claim 1, wherein the sill pan system is configured to work with an American Disabilities Act (ADA)-compliant threshold.

5. The sill pan system of claim 1, wherein the left top panel and the right top panel are sloped downward about 1-10 degrees above horizontal, wherein the slope is continual from a back edge to a front edge of the left top panel and the right top panel.

6. The sill pan system of claim 1 wherein the left and right vertical walls have a height of about 2 inches.

7. The sill pan system of claim 1, wherein the L-shaped left flange and the L-shaped right flange each have a first end with a height that differs from a second end with a height.

8. The sill pan system of claim 7, wherein the first end of the L-shaped left and right flanges has a height of about 3.25 inches and the second end of the L-shaped left and right flanges has a height of about 1 inch.

9. The sill pan system of claim 1, wherein the left top panel and the right top panel each have a length of about 19.5 inches.

10. The sill pan system of claim 2, wherein the grooves cover about 100 percent of the bottom face of the left and right end segments.

11. A sill pan kit comprising:

a plurality of left end segments, each left end segment defined by:

a left top panel comprising a left edge, a right edge, a length, and a width;

a left vertical wall extending upward from the left edge of the left top panel and extending the width of the left top panel;

an L-shaped left flange extending downward from a front edge of the left top panel and upward to contact a side edge of the left vertical wall;

a left panel back dam positioned at a rear edge of the left top panel, extending in an upward direction;

a lip positioned at the right edge of the left top panel, the lip defined as an extension adjacent to a top face of the left top panel with a thickness that is less than the thickness of the left top panel, wherein the decreased thickness is adjacent to the bottom face of the left top panel;

a plurality of right end segments, each right end segment defined by:

a right top panel comprising a left edge, a right edge, a length, and a width;

a right vertical wall extending upward from the right edge of the right top panel and extending the width of the right top panel;

an L-shaped right flange extending downward from a front edge of the right top panel and upward to contact a side edge of the right vertical wall;

a recessed region positioned at the left edge of the right top panel, the recessed region defined as an extension adjacent to a bottom face of the top right panel with a thickness that is less than the thickness of the right top panel, wherein the decreased thickness is adjacent to the top face of the right top panel;

a plurality of spacing ribs positioned on a top face of the right end recessed region of the right top panel at the left edge of the right top panel;

a back dam positioned upward from the top face of the right top panel and the top face of the left top panel, the back dam comprising a height of at least 0.1 inch and no more than 0.1875 inches, wherein the back dam comprises a first segment comprising an area of reduced thickness adjacent to the lip of the left top panel, and wherein the back dam comprises a second segment of reduced thickness adjacent to the recessed region of the right top panel, wherein the back dam first and second segments of reduced thickness overlap;

wherein the lip is configured to overlay the spacing ribs, thereby joining the left end segment to the right end segment at a seam;

wherein the lip and the recessed region overlap at a rear edge of the left and right top panels;

wherein the thickness of the lip and the thickness of the recessed region when overlapped is the same thickness of the left top panel and the same thickness as the right top panel;

wherein one of the plurality of left end segments can be joined to one of the plurality of right end segments to create an assembled sill pan system.

12. A method of installing the sill pan system of claim 1 along a framed in doorway opening, the method comprising:

fitting the left end segment at a lower left corner of the framed in door opening;

fitting the right end segment at a lower right corner of the framed in door opening;

adhering the lip to overlay the spacing ribs, thereby joining the left end segment to the right end segment at a seam;

wherein the L-shaped left and right flanges extend below the framed in door opening and to the left and right of the framed in door opening;

wherein the left and right vertical walls extend upward within the framed in door opening.

13. The method of claim 12, wherein the left end segment and the right end segment each include a bottom face defined by a plurality of grooves.

14. The method of claim 13, wherein a bottom face of the lip lacks grooves.

15. The method of claim 12, wherein the sill pan system is configured to work with American Disabilities Act (ADA) compliant thresholds.

16. The method of claim 12, wherein the left top panel and the right top panel are sloped downward about 1-10 degrees above horizontal.

17. The method of claim 12, wherein the left and right vertical walls have a height of about 2 inches.

18. The method of claim 12, wherein the L-shaped left flange and the L-shaped right flange each have a first end with a height that differs from a second end with a height.

19. The method of claim 12, wherein the left top panel and the right top panel each have a length of about 19.5 inches.

20. The method of claim 13, wherein the grooves cover about 100 percent of the bottom face of the left and right end segments.

* * * * *